June 30, 1959  H. C. KEYSOR  2,892,624
AXIAL LOAD SPRING
Filed March 21, 1957  2 Sheets-Sheet 1

INVENTOR.
Harold C. Keysor
Witness:
William N. Ember
BY Walter L. Schlegel, Jr.
Atty.

June 30, 1959 H. C. KEYSOR 2,892,624
AXIAL LOAD SPRING
Filed March 21, 1957 2 Sheets-Sheet 2

INVENTOR.
Harold C. Keysor
BY Walter L. Schlegel, Jr.
Atty.

Witness:
William N. Ember

# United States Patent Office 2,892,624
Patented June 30, 1959

2,892,624

AXIAL LOAD SPRING

Harold C. Keysor, La Grange Park, Ill., assignor to American Steel Foundries, Chicago, Ill., a corporation of New Jersey Application March 21, 1957, Serial No. 647,521

5 Claims. (Cl. 267—61)

My invention relates to helical springs, and more particularly, to helical spring assemblies comprising three or more springs.

My invention proposes to eliminate many disadvantages encountered in conventional helical springs. A conventional helical spring comprises a bar coiled in a number of turns about a helix axis at a predetermined helical angle. The spring has its end portions ground to provide flat seats which are perpendicular to the helix axis. Under a compression load, the height of the spring is reduced whereby the upper edge of one spring turn makes contact and engages with the lower edge of a second spring turn above. However, due to deformities of the spring, tilting or angling of the spring occurs which tends to increase wear on spring guides or seats. When a conventional compression spring is subjected to periodical compressive loads, vibration (or surging as it is also called) of the coils may occur due to dynamic effects. Examples of such springs are valve springs for internal combustion engines and recoil springs for guns. Particularly severe dynamic effects may occur in cases when a harmonic in the motion of the spring end has a frequency which coincides with one of the natural frequencies of the spring. When this occurs, fatigue failure of the spring may result.

On the other hand, my invention comprises a helical spring assembly which will tend to eliminate tilting or angling of springs. The compressive load will be perfectly axial instead of eccentric to the helix axis of the spring. Consequently, wear on the spring assembly will be reduced. Also grinding of spring ends will be eliminated. Because of elimination of grinding, the spring strength at the ends of the spring will be greater than in a conventional spring having the same general dimensions throughout. Most important of all, the natural frequencies of the spring assembly will be increased by approximately 10 percent, which will, in some cases, remove the resonant frequency further from the operating frequency and, therefore, decrease the peak stresses due to resonance.

Therefore, one of the objects of my invention is to provide a spring assembly in which the resultant load will always be axial.

A further object is to provide a spring assembly which will eliminate circular motion of the spring ends under compression loads so as to maintain the elements thereof in their proper relationship with each other.

A still further object is to eliminate wear on spring assemblies and, consequently, decrease replacement costs of springs.

A more specific object is to reduce fatigue failure in springs.

Other objects, features, capabilities and advantages are comprehended by the invention and will be apparent from the following specification and drawings, wherein.

Figure 1:
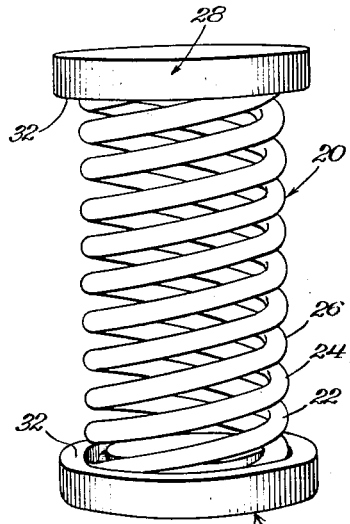
Figure 1 is an elevational view of the spring assembly embodying my invention.
Figure 2:
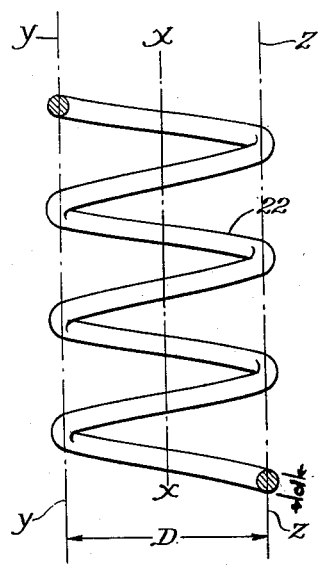
Figure 2 is an elevational view of an individual helical spring taken from the embodiment of Figure 1.

Describing the structure in detail and referring now to the drawings of Figures 1–8, inclusive.

The axial load spring assembly 20 (Figure 1) comprises a spring 22 having a helix or longitudinal axis $x$—$x$ (Figure 2) which is disposed longitudinally of the spring and equidistant from all corresponding points on the spring 22. The spring 22 has a mean coil diameter D, which is indicated by the distance perpendicular to and between parallel spaced lines $y$—$y$ and $z$—$z$, the lines $y$—$y$ and $z$—$z$ being parallel to the helix or longitudinal axis and passing through the center points of the ends of the spring bar stock. The spring bar stock has a diameter $d$. The spring assembly 20 also comprises helical springs 24 and 26 which are substantially identical to spring 22.

Figures 3, 4:
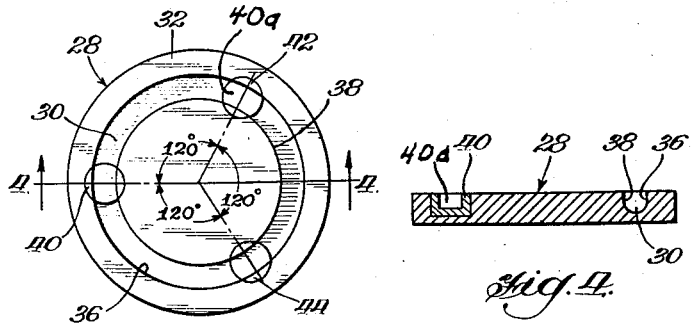
Figure 3 is a top plan view of one of the end plates shown in the embodiment of Figure 1.
Figure 4 is a sectional view of the end plate taken on line 4—4 of Figure 3.

Figure 3 is a top plan view and Figure 4 is a sectional view of an end plate 28, two of which are required and are shown in Figure 1. The end plate 28 comprises a groove or recess 30 disposed at the inner surface 32. The bottom of the groove 30 has a diameter which is equal to the mean coil diameter D of spring 22. The groove 30 comprises parallel spaced vertical sides 36 and 38 which extend below the inner surface 32 and have a linear displacement or distance from each other which is slightly larger than the bar stock diameter $d$, wherein the larger displacement is necessary in order to accommodate the spring stock ends of springs 22, 24, and 26. The vertical sides 36 and 38 extend below the inner surface 32 for a vertical distance equal to one half of the bar stock diameter $d$ and if desired, merge, as shown in Figure 4, in order to form a curved segment at the lower ends of sides 36 and 38 wherein the curved segment is equal to one-half the circumference of one of the spring ends. If it is desired, the groove 30 may be rectangular in shape.

Stops 40, 42, and 44 are substantially identical to each other and are disposed in groove 30. The stops 40, 42, and 44 are positioned 120° apart from each other and partition the groove 30 into three equal segments or divisions. The stops may be cylindrical in shape wherein the cylinder has a diameter slightly larger than the linear distance between vertical sides 36 and 38 and a depth less than or equal to the depth of the recess or groove 30. The depth or height of the stops 40, 42, and 44 will depend on the size of the springs used and the amount of deflection desired from the spring assembly 20. If desired, the stops may be cut or ground as at 40$d$ prior to insertion in the groove 30 or the stops may be ground after insertion in the groove 30 in order to reduce the height of the stops within groove 30. The reduction in height of the stops 40, 42, and 44 will permit a portion of the spring turns disposed at the ends of the springs 22, 24, and 26 to be depressed into the groove 30 with the result that greater deflection of the spring assembly 20 will be achieved.

It should be noted that the stops 40, 42, and 44 may be rectangular in shape. As it is necessary to drill or machine holes in the end plate in order to insert and maintain the stops 40, 42, and 44 in their respective relationship, it would be more practical, however, to drill circular holes and more convenient to use cylindrical stops rather than rectangular stops.

It should also be noted that the stops may be any shape whatever. It is desired that the stops form an abutment for the spring ends.

The helical springs 22, 24, and 26 are assembled by winding or screwing one spring through the end of a second, and the third spring is then screwed into the ends of the first two assembled springs. The assembled springs are interassembled and are actually triple threaded. The shape or form of the assembled springs might be considered as a cylinder wherein the cylinder has one longitudinal axis.

Figure 5:
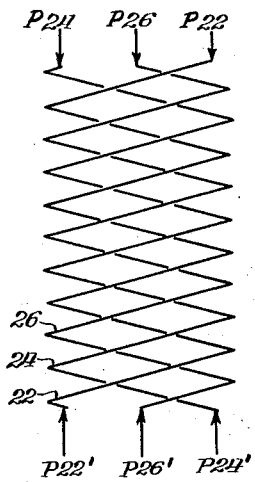
Figure 5 is a schematic single line elevational view illustrating the compressive loads acting on the three assembled springs.

Figure 5 is a schematic diagram of the three assembled springs 22, 24, and 26 under load. Each spring has a compressive component load acting downwardly on each spring end. The downward component load acting on spring 22 is designated as $P_{22}$, whereas the downward component loads on springs 24 and 26 are designated $P_{24}$ and $P_{26}$, respectively. The total load on the springs is the sum of the three component loads or $$P = P_{22} + P_{24} + P_{26}$$

where $$P_{22} = P_{24} = P_{26}$$

As shown in Figure 5, the springs also have upwardly directed reactive loads $P_{22'}$, $P_{24'}$ and $P_{26'}$, respectively. These reactive loads oppose the downwardly directed compressive loads because of the fact that each action has an equal and opposite reaction.

As stated previously two substantially identical end plates 28 are utilized in the spring assembly 20. The assembly is completed by placing the corresponding ends of springs 22, 24, and 26 into the groove 30 and against stops 40, 42, and 44, respectively, in each end plate. By placing the corresponding ends of the springs against the stops, the spring ends are positioned 120° apart from each other and, consequently, maintain the springs 22, 24, and 26 in proper relationship with respect to each other. As a compressive load is applied to the assembly 20, the ends of the springs 22, 24, and 26 tend to rotate in the groove 30 against stops 40, 42, and 44, respectively.

Figure 6:
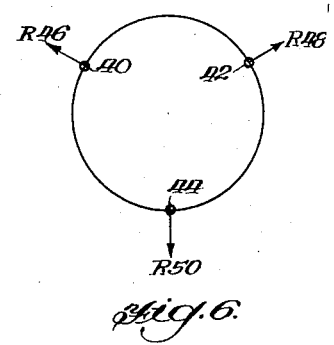
Figure 6 is a single line schematic plan view of the component forces acting on the plate.

As shown in Figure 6, the springs 22, 24, and 26 exert radial forces or radial components $R_{46}$, $R_{48}$, and $R_{50}$, respectively, which are directed outwardly and away from the center of the end plates. These radial components $R_{46}$, $R_{48}$ and $R_{50}$ are located at stops 40, 42, and 44, respectively. As the component loads on the springs are equal, the radial components are equal, and, consequently, the radial components neutralize each other.

Figure 7:
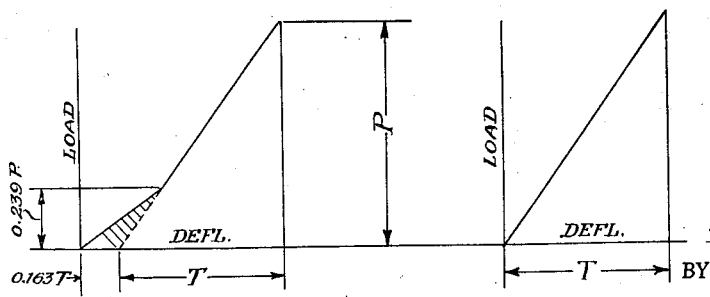
Figure 7 is a theoretical load deflection diagram comparison of a three-ply spring assembly and a conventional spring assembly.
Figure 9:
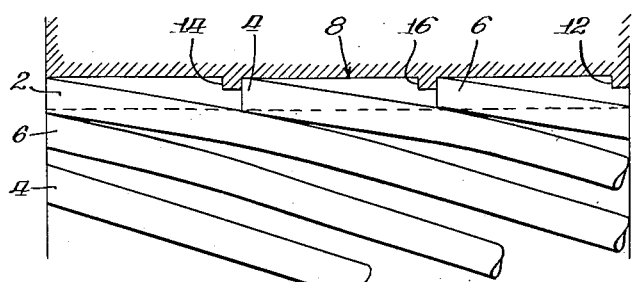
Figure 9 is a fragmentary view of a modification of my invention.

The theoretical load-deflection diagrams of Figure 7 show the deflections of the three-ply spring assembly under a given load as compared to the deflection of a conventional spring assembly under an equal given load. The right hand curve shows the deflection T of the conventional assembly. The left hand curve shows the deflection $T + .163T$ of the three-ply assembly. The increased deflection of the novel spring assembly was obtained due to the effect of closure of the ends of the springs 22, 24, and 26 in the groove 30. As seen in Figure 9, the ends of the springs 2, 4, and 6 are bent or curved so as to permit the insertion of the spring ends in the groove 30. It will be noted after the spring ends touch each other, the ends of the springs become inactive and only the intermediate portions of the springs 2, 4, and 6 remain active. In effect, the springs are shortened which results in greater stability and strength of the spring assembly 20.

The 16.3% increase in deflection of my novel spring assembly was discovered by tests. However, the value depends on the proportion of the springs included in the assembly, and therefore, should not be considered as a true value for all spring assemblies of this type.

Figure 8:
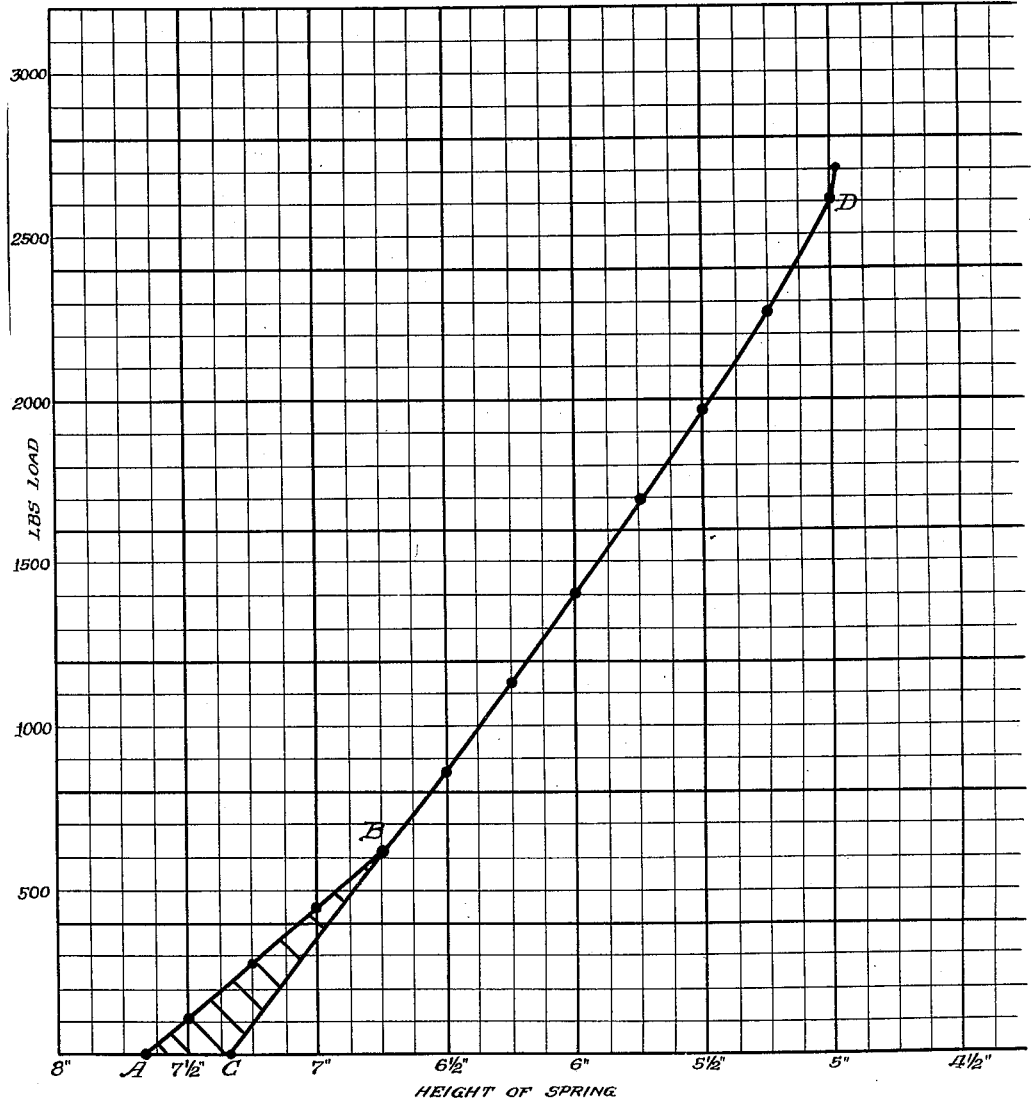
Figure 8 is an actual load deflection curve of a three-ply spring assembly.

Figure 8 is an actual load deflection diagram of a three-ply spring assembly under a given load. The ordinate or vertical axis of the diagram shows the actual amount of loads in pounds used to deflect the spring and the abscissa or horizontal axis shows the total amount of deflection of the spring under the given load. The actual diagram is similar to the theoretical load diagram of Figure 7. Under test conditions hardened spherical balls freely movable on ground plates were used to permit lateral movement and angling of the top plate but no such tendencies were apparent. This discloses the fact that the load on the assembly was perfectly axial, a decided improvement over conventional springs where the load will not be perfectly axial.

Figure 9 is a modification of my invention wherein the end of each spring bears against the adjacent spring, thus reducing the free height of the assembly. This would be practical where space is at a premium. The spring assembly of Figure 9 is preloaded to compress the springs 2, 4, and 6. Under compression, the spring ends of spring 2 touch spring 6, the ends of spring 4 touch spring 2, and the ends of spring 6 touch spring 4. The springs abut stops 12, 14 and 16.

The spring assembly of Figure 9 may also comprise springs which may be preformed to produce the assembly shown. In other words, the ends of springs 2, 4, and 6 may be formed as shown prior to assembling of the spring assembly.

I claim:

1. An axial load spring assembly comprising spaced end supports having mutually facing surfaces, annular guide grooves in respective surfaces, each groove being defined by substantially parallel surfaces, and each support having three substantially equidistantly spaced spring stops fixed thereto in its groove, three interthreaded coiled springs having their ends approximately equidistantly spaced from each other and disposed within the grooves of respective supports, each end of each spring being seated against one of said stops, the depth of said grooves between said stops being at least approximately equal to the bar diameter of said springs, and each of said springs slidably engaging the surfaces of its related groove to giude the coils of the springs and prevent lateral instability and buckling of said coils during loading of the assembly by movement of said supports toward each other.

2. An axial load spring assembly comprising mutually facing end supports, mutually facing annular grooves in respective supports, each groove being partly defined by spaced substantially parallel coaxial surfaces, and each support having in its groove three substantially equidistantly spaced stops extending less than half the depth of the groove from its bottom, three coiled springs having interthreaded coils and arranged with their ends approximately equidistantly spaced from each other in abutment with respective stops of said supports, said springs having a bar diameter slightly less than the width of said grooves and being slidably fitted therein, and the depth of said grooves between said stops being at least approximately equal to said bar diameter to guide the coils and prevent lateral buckling and instability thereof during loading of the assembly by movement of the supports toward each other.

3. An axial load spring assembly comprising spaced end plates, each having in its inner surface an annular groove defined at the sides thereof by spaced substantially parallel surfaces, each of said plates having three equidistantly spaced stops fixed thereto in its groove, three substantially identical interthreaded helical springs having their ends disposed within the grooves of said plates, each end of each spring being seated against one of said stops, the depth of said grooves being at least approximately equal to the bar diameter of said springs, and the space between said surfaces being slightly greater than said bar diameter to slidably receive and guide said springs, said plates being movable toward each other to load the spring assembly.

4. A spring assembly according to claim 3, wherein each end of each spring bears against another of the springs when the spring assembly is unloaded.

5. An axial load spring assembly comprising mutually facing end supports, mutually facing grooves in respective supports, each groove being of substantially uniform width outwardly of its bottom and being defined outwardly of its bottom by spaced substantially coaxial surfaces, a plurality of substantially equidistantly spaced holes in each support interrupting its groove, plugs in respective holes, grooves in respective plugs having the same width as the groove in the support and having less depth than the groove in the support, the grooves in the support and plugs communicating with each other and defining a continuous annular channel, three coiled springs having their coils interthreaded and arranged with their ends approximately equidistantly spaced from each other in abutment with respective plugs, said springs having a bar diameter slightly less than the width of said grooves and being guided thereby as the assembly is loaded by movement of said supports toward each other, the depth of the grooves in the supports being at least approximately equal to said bar diameter.

References Cited in the file of this patent

UNITED STATES PATENTS

| | | |
|---|---|---|
| 134,646 | Culmer | Jan. 7, 1873 |
| 350,631 | Leaman | Oct. 12, 1886 |
| 1,719,411 | Weidenbach | July 2, 1929 |
| 1,924,604 | Gray | Aug. 29, 1933 |

FOREIGN PATENTS

| | | |
|---|---|---|
| 284,014 | Great Britain | Jan. 23, 1928 |